United States Patent [19]

McGrevy

[11] Patent Number: 5,716,651
[45] Date of Patent: *Feb. 10, 1998

[54] FLUID INJECTING APPARATUS

[75] Inventor: Alan N. McGrevy, Chino, Calif.

[73] Assignee: Caco Pacific Corporation, Covina, Calif.

[*] Notice: The portion of the term of this patent subsequent to May 7, 2013, has been disclaimed.

[21] Appl. No.: 614,177

[22] Filed: Mar. 12, 1996

Related U.S. Application Data

[63] Continuation of Ser. No. 227,057, Apr. 13, 1994, Pat. No. 5,513,976.
[51] Int. Cl.$^6$ ..................................................... B29C 45/20
[52] U.S. Cl. ......................................... 425/549; 264/328.15
[58] Field of Search ........................ 425/549; 264/328.15

[56] References Cited

U.S. PATENT DOCUMENTS

| 5,284,436 | 2/1994 | Gellert | 425/549 |
| 5,513,976 | 5/1996 | McGrevy | 425/549 |

*Primary Examiner*—Tim Heitbrink
*Attorney, Agent, or Firm*—The Law Firm of Sheldon & Mak

[57] ABSTRACT

A nozzle has a runner for passing fluid through the nozzle. The fluid is heated as it passes through the runner. The temperature of the fluid may be regulated. The fluid flows from the runner into a well formed in a nozzle well insert which is disposed on the nozzle. A gate is disposed in the nozzle well insert in communication with the well. A tip having a raised portion and a reduced portion, each extending in a helical pattern, is disposed in the runner with the raised portion abutting the surface of the runner. The outlet end of the tip is disposed relative to the well in the nozzle well insert so that the fluid in the reduced portion of the tip flows in a swirling motion through the well to wipe the surface of the well and remove the fluid previously in the well. The surfaces of the raised and reduced portions of the tip may be coated with a material to prevent such surfaces from becoming deformed by the fluid flowing through the tip and the gate into the mold. In this way, a fluid of one color (e.g. blue) can be quickly replaced in the well with a fluid of a second color (e.g. red) to produce satisfactory articles purely of the second color (e.g. red). This results from the wiping action in the well by the fluid flowing in the helical path through the tip and the well.

29 Claims, 1 Drawing Sheet

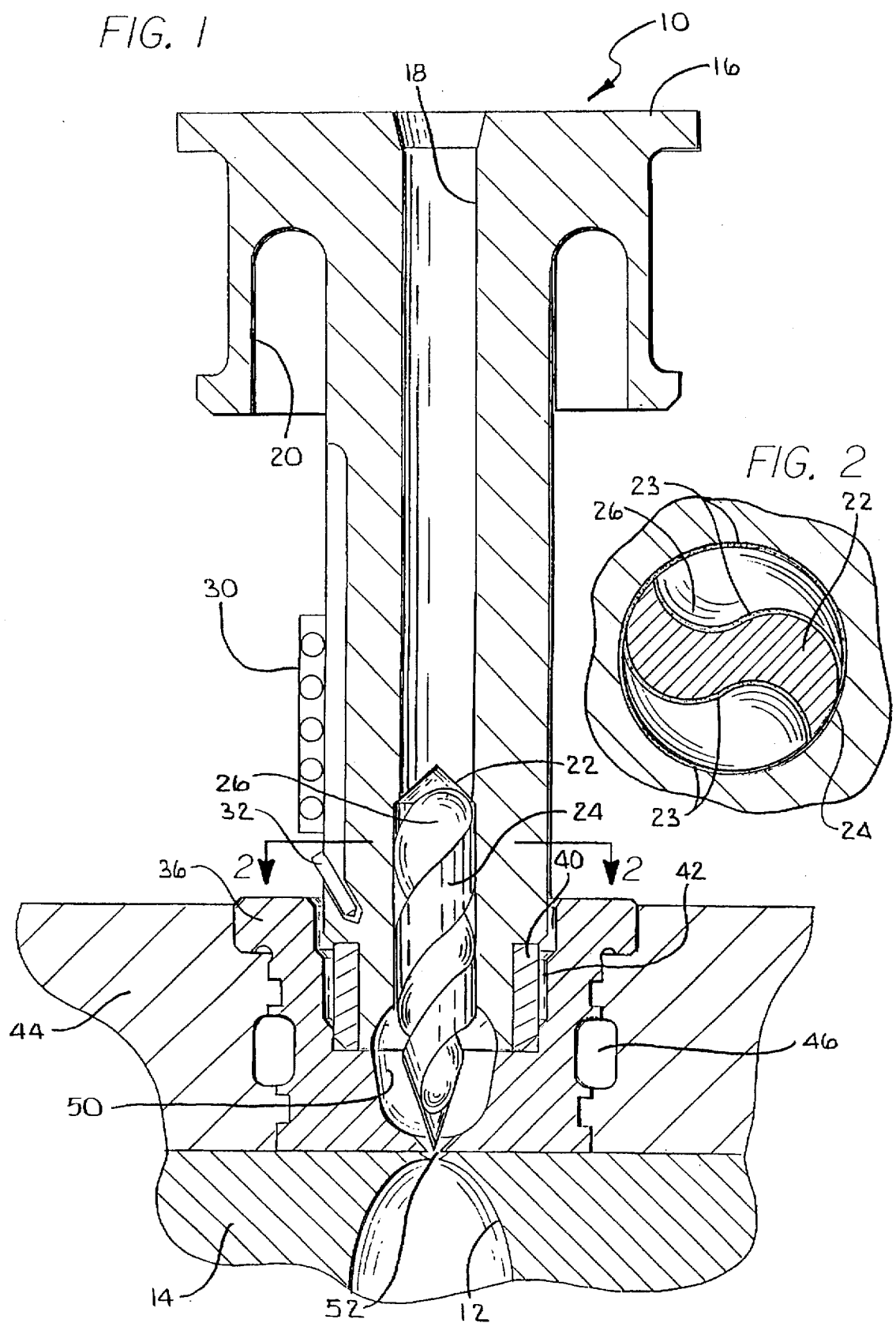

FLUID INJECTING APPARATUS

This is a continuation of application Ser. No. 08/227,057 filed Apr. 13, 1994 now U.S. Pat. No. 5,513,976.

This invention relates to apparatus for injecting fluid into a mold to form articles corresponding to a cavity in the mold. The invention particularly relates to apparatus for initially injecting fluid of a first color (e.g. red) into a cavity in a mold to form articles of the first color and for subsequently injecting a fluid of a second color (e.g. blue) into the cavity in the mold to form, after a minimal delay, articles which are purely of the second color and are not tainted by the first color.

BACKGROUND OF THE INVENTION

Articles are often formed by injecting heated fluid into a mold. The fluid is introduced into a runner in a nozzle body. The fluid then flows through a gate into a hollow cavity in the mold. The fluid is heated as it flows through the runner in the nozzle body. When the fluid has solidified in the hollow cavity in the mold, it is sheared at the position where the fluid flows through the gate into the mold cavity.

Articles have been formed for decades, if not for centuries, by injecting fluid into hollow cavities in molds. In all of this period of time, certain problems have continued to exist in spite of considerable efforts during this period to resolve such problems. For example, when articles have been formed in a first color (e.g. blue) and articles are then desired to be formed in a second color (e.g. red) different from the first color, it has been difficult to rid the nozzle runner and the gate of any fluid of the first color. As will be appreciated, it is important to rid the nozzle body of any fluid of the first color so that this fluid will not taint the fluid of the second color as the fluid of the second color flows through the nozzle runner.

In order to cleanse the nozzle runner of the first color, fluid of the second color has had to be passed through the nozzle body for an extended period of time. During this extended period of time, any articles formed have not been able to be used since the color of such articles has been a mixture of the first and second colors. Furthermore, the color of the mixture is not predictable at any instant during the initial period after the fluid of the second color has been substituted for the fluid of the first color. This has represented a considerable waste of fluid. It has also represented a considerable period of time in which the nozzle and the molds cannot be gainfully used.

BRIEF DESCRIPTION OF INVENTION

This invention provides apparatus which satisfactorily resolves the problems discussed in the previous paragraphs. It provides for an initial formation of articles of one (1) color (e.g. blue) and then, in a minimal time thereafter, for a formation of articles in a second color (e.g. red) without any contamination of the articles of the second color by the fluid previously provided in the first color.

In one embodiment of the invention, a nozzle has a runner for passing fluid through the nozzle. The fluid is heated as it passes through the runner. The temperature of the fluid may be regulated. The fluid flows from the runner into a well formed in a nozzle well insert which is disposed on the nozzle. A gate is disposed in the nozzle well insert in communication with the well. A tip having a raised portion and a reduced portion, each extending in a helical pattern, is disposed in the runner with the raised portion abutting the surface of the runner. The outlet end of the tip is disposed relative to the well in the nozzle well insert so that the fluid in the reduced portion of the tip flows in a swirling motion through the well to wipe the surface of the well and remove the fluid previously in the well.

The surfaces of the raised and reduced portions of the tip may be coated with a material to prevent such surfaces from becoming deformed by the fluid flowing through the tip and the gate into the mold. In this way, a fluid of one color (e.g. blue) can be quickly replaced in the well with a fluid of a second color (e.g. red) to produce satisfactory articles purely of the second color (e.g. red). This results from the wiping action in the well by the fluid flowing in the helical path through the tip and the well.

BRIEF DESCRIPTION OF DRAWING

In the drawings:

FIG. 1 is a sectional view in elevation of one embodiment of apparatus for injecting fluid into a cavity in a mold; and FIG. 2 is a sectional view taken substantially on the line 2—2 of FIG. 1 and illustrates the construction of a tip in additional detail, the tip constituting an important element in the embodiment of the invention.

DETAILED DESCRIPTION OF INVENTION

FIGS. 1 and 2 illustrate one embodiment of the invention, generally indicated at 10, for injecting fluid into a cavity 12 in a mold 14 to form an article having a configuration corresponding to the configuration of the cavity. The article 10 includes a nozzle 16 having a runner 18 which extends through the nozzle. The nozzle 16 is provided with an air pocket 20 for insulating the nozzle. The nozzle 16 may be made from a suitable material such as steel.

A tip 22 is disposed in the nozzle. The tip 22 may be made from a suitable material such as a high speed steel or a tungsten carbide to provide the tip with a relatively high value of Rockwell hardness. For example, the tip 22 may have a Rockwell hardness of approximately sixty (60) when it is made from such materials. The tip 22 may be coated with a material such as titanium nitride as at 23 to increase the Rockwell hardness of the tip. When the tip 22 is coated with the layer 23 of titanium nitride, the Rockwell hardness of the tip may be increased to a value of seventy (70) or eighty (80). Such a coating is desirable when fluids having an abrasive action pass through the runner 18. Such an aggressive fluid may be a plastic with a glass fibre loading.

The tip 22 may have a raised or fluted portion 24 and a reduced portion 26 each extending in a spiral or helical path in contiguous relationship to each other through the runner 18. The spiral or helical path for the raised portion 24 and the reduced portion 26 may extend through the runner 18 in a plurality of turns with the reduced portion 26 in each turn being disposed between adjacent turns of the raised portion 24. The raised portion 24 is disposed in an abutting relationship (in other words, a close fit) with the internal wall defining the runner 18. The raised portion 24 and the reduced portion 26 may be considered to be defined as by flutes. The tip has a progressively converging portion 27 (preferably conical) at its free end. The raised portion 24 and the reduced portion 26 preferably extend to the converging portion 27.

A heater band 30 is disposed adjacent the nozzle 16 to heat the fluid in the runner 18. A thermocouple 32 may be disposed in a socket in the nozzle 16 to regulate the temperature of the fluid in the runner 18. For example, the thermocouple 32 may regulate the temperature of the fluid in the runner 18 at a suitable value such as approximately 450° F.

A nozzle well 36 made from a suitable heat conductive material such as a stainless steel or an H13 steel is disposed on the nozzle 16. A collar 40 made from a suitable material such as titanium is disposed on the nozzle 16 between the nozzle well insert 36 and the nozzle. A material such as titanium is desirable because it is a relatively poor heat conductor. For example, its heat transfer coefficient is approximately one and one half (1½)–two (2) times less than that of steel. It is also desirable because it has a relatively high strength and a relatively high resilience.

The collar 40 may be tightly disposed on the nozzle 16. An air gap 42 may be disposed between the collar 40 and the nozzle well insert 36 to provide heat insulation. A mold plate 44 may in turn envelope the nozzle well insert 36. The collar 40 and the air gap 42 provide heat insulation between the nozzle 16 and the well nozzle insert 36. A fluid such as water may flow through a conduit 46 defined by the nozzle well insert 36 and the mold plate 44 to provide a cooling action.

A well 50 is disposed in the nozzle well insert 36 at the end of the tip 22 near the mold 14. The well 50 communicates with a gate 52 contiguous to the cavity 12 in the mold 14. The fluid flowing through the runner 18 then flows in a spiral or helical path through the reduced portion 26 of the tip 22. The helical path for the fluid flow causes the fluid to wash or wipe the surface defining the well 50 in the nozzle well insert 36. This washing or wiping action quickly removes the fluid previously in the well and even removes the fluid on the surface defining the well.

The washing or wiping action is facilitated by the swirling motion produced in the fluid by the spiral or helical path defined by the reduced portion 26 in the tip 22. The washing or wiping action is also facilitated by the heat imparted to the fluid in the reduced portion 26 of the tip 22 as a result of the abutting relationship between the raised portion 24 of the tip 22 and the internal wall defining the runner 18 in the nozzle 16.

The washing or wiping action of the fluid on the wall defining the well 50 provides a significant advantage over the apparatus of the prior art. It minimizes the time for producing articles of a pure color when the fluid in the runner 18 is changed from a first color (e.g. blue) to a second color (e.g. red). This provides for an efficient operation of the apparatus and for a minimal loss of time and fluid in making the transition between the fluids of different colors.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for heating and passing fluid into a mold,
    a nozzle,
    there being a runner in the nozzle for receiving and passing the fluid through the nozzle,
    means for heating the fluid in the nozzle runner during the passage of the fluid through the nozzle runner,
    a spiral tip in the nozzle runner for receiving the fluid passing through the nozzle runner and for directing the fluid in a spiral path through the nozzle runner and for heating the fluid in accordance with the heat from the heater means during the direction of the fluid in the spiral path through the runner,
    a gate at the end of the spiral tip for passing the heated fluid from the nozzle runner into the mold,
    a nozzle well insert disposed in enveloping relationship to the nozzle body and the spiral tip for defining with the spiral tip a well for passing the fluid into the mold through the opening in the mold, and
    a collar disposed on the nozzle between the nozzle and the nozzle well insert and made from a material providing a lower heat conductivity than the heat conductivity of the nozzle and the nozzle well insert.

2. A nozzle for heating and passing fluid into a mold through an opening in the mold, including,
    there being a runner in the nozzle body,
    a nozzle well insert disposing the nozzle body and having a wall defining a well for holding the fluid and having a gate disposing communication with the well for passing the fluid into the mold,
    first means disposed in the runner in communication with the well in the nozzle well insert providing a helical path having a raised portion and a reduced portion for passing the fluid through the runner and the well in a spiral path to wash the wall defining the well with the fluid flowing in the spiral path,
    said first means being made from hard material and being coated with the material having an increased hardness thats relative to the hardness of the material of the first means,
    second means for heating the fluid through the nozzle runner to the fluid flowing in the spiral path, said first means being constructed and disposed relative to the runner and the well, and the second means to pass heat from the second means to the fluid flowing in the spiral path in the first means through the nozzle runner and through the well in the nozzle well insert, said second means including means for regulating the heat produced by the second means for transfer to the fluid flowing through the nozzle runner and the well in the nozzle well insert, and
    third means made from a heat insulating material for insulating the nozzle well insert from the heat of the fluid passed by the first means through the nozzle runner and the well and the nozzle well insert including an air gap between said third means and the nozzle well for insulating the nozzle well insert from the heat of the fluid passed by the first means.

3. A nozzle as set forth in claim 2, wherein,
    the raised portion and the reduced portion in the first means extends into the well to the tip of the first means,
    the well having a wall shaped to be washed by the fluid passing through the reduced portion of the first means disposed in the well.

4. In combination for heating and passing fluid into a mold,
    a nozzle body,
    there being a runner in the nozzle body,
    a nozzle well insert disposed in the nozzle body and having a wall defining a well for holding the fluid and having a gate disposed in communication with the well for passing the fluid into the mold,
    first means dispose in the runner in communication with the well and the nozzle well insert for passing the fluid through the well in a spiral path to wash the wall designing the well with the fluid flowing in the spiral path, and
    second means for heating the fluid flowing through the nozzle runner and through the spiral path,
    the first means being constructed to pass the heat from the second means to the fluid flowing in the spiral path through the well in the nozzle well insert, the first means having a raised portion disposed in a spiral path configuration with successive space turn and having a reduced portion disposed in a spiral path configuration between the successive spaced turns of the raised portion for receiving the fluid and directing the fluid in the spiral path and the first means through the nozzle runner and the well in the nozzle well insert, the raised portion and the reduced portion of the first means extending into the well.

5. The combination as set forth in claim 4, including, the well being defined by a wall, the spiral tip having a progressively converging portion in the well in the nozzle well insert and the progressively converging portion of the spiral tip having an external periphery defining the spiral path of the fluid flowing through the well to wash the wall defining the well with such fluid.

6. The combination as set forth in claim 5, including, the spiral tip being coated with a material having properties of increasing the Rockwell hardness of the first means.

7. The combination as set forth in claim 5, including, the spiral tip having a raised portion disposed in a spiral configuration with successive spaced turns and having a reduced portion disposed in a spiral configuration between the successive turns of the raised portion for receiving the fluid and directing the fluid in the spiral path in the spiral tip through the nozzle runner and the well in the nozzle well insert.

8. The combination as set forth in claim 7, including, the spiral tip being constructed and disposed relative to the runner and the well to pass the heat from the heating means to the fluid flowing in the spiral path in the spiral tip through the nozzle runner and through the well in the nozzle well insert.

9. The combination as set forth in claim 8, including, the spiral tip being coated with a material having properties of increasing the Rockwell hardness of the first means.

10. The combination as set forth in claim 9, including, insulating means disposed between the runner and the nozzle well insert, and an air gap between the insulating means and the nozzle well insert.

11. The combination as set forth in claim 4, including, means disposed on the nozzle body between the nozzle body and the nozzle well insert and made from a heat insulating material for insulating the nozzle well insert from the nozzle body, there being an air gap between the heat insulating means and the nozzle well insert.

12. A nozzle for heating and passing a fluid into a mold through an opening in the mold, including,
a nozzle body,
there being a runner in the nozzle body,
first means disposed at the end of the runner in the nozzle body for defining a well and a gate at the end of the well for passing the fluid from the runner and through the well and the gate,
second means disposed in the runner and in the well in a co-operative spiral relationship with the runner in the first means and with the well through the runner and the length of the well for receiving the fluid passing through the runner and the length of the well and for producing a swirling movement of the fluid through the runner and the length of the well and into the gate as the fluid flows through the runner and the well in the co-operative spiral relationship between the second means and the runner and between the second means and the well, and
third means for heating the fluid during the movement of the fluid through the runner.

13. A nozzle as set forth in claim 12, including, the well being defined by a wall,
the second means being constructed and being disposed in the well relative to the wall defining the well for providing a wiping action of the fluid on the wall defining the well along the length of the well as a result of the swirling movement of the fluid through the well.

14. A nozzle as set forth in claim 12, including, the well being defined by a wall,
the second means being spirally fluted through the end of the runner and through the length of the well to receive the heat from the third means in the portion of the second means between the spiral flutes and to pass the heated fluid through the spiral flutes for the wiping action of the fluid on the wall defining the well.

15. A nozzle as set forth in claim 14, including, the runner being defined by a wall,
the well being defined by a wall,
the spiral flutes in the second means engaging the wall defining the runner to pass heat from the third means to the fluid flowing through the space between the flutes in the second means.

16. A nozzle as set forth in claim 15, including, the second means being coated with a material to increase the Rockwell hardness of the second means in withstanding surface deformations of the second means as a result of the flow of the fluid in the runner and the well, and
means for regulating the heat applied by the third means to the fluid during the movement of the fluid through the runner and the well and the gate.

17. A nozzle as set forth in claim 14, including, the well being defined by a wall,
the spiral flutes in the second means extending into the well to produce a wiping action of the fluid on the wall defining the well.

18. A nozzle as set forth in claim 12, including, the second means being made from a material having properties of withstanding any surface deformation as a result of any aggressive action of the fluid flowing through the nozzle runner and the well.

19. A nozzle as set forth in claim 18, including, the second means being coated with a material to increase the Rockwell hardness of the second means in withstanding surface deformations of the second means as a result of the flow of the fluid in the runner and the length of the well.

20. A nozzle as set forth in claim 19, including, the first means including a nozzle well insert disposed on the nozzle body and defining the well,
the spiral tip extending through the well in the nozzle body and the nozzle well insert to a position contiguous to the opening in the mold to direct the fluid in the spiral tip through the well to wash the well.

21. A nozzle as set forth in claim 20, including, the nozzle well insert having a gate contiguous to the opening in the mold and communicating with the well, and means disposed between the nozzle well insert and the nozzle body for insulating the nozzle well insert from the heat of the nozzle.

22. A nozzle as set forth in claim 21, including, the spiral tip being made from a material having a high Rockwell hardness, and the spiral tip being coated with a material having properties of increasing the Rockwell hardness of the spiral tip.

23. A nozzle as set forth in claim 21, including, an air gap between the insulating means and the nozzle well insert.

24. A nozzle as set forth in claim 12, including, means for regulating the heat applied by the third means to the fluid during the movement of the fluid through the runner and the well and the gate.

25. A nozzle as set forth in claim 12, including, a nozzle well insert disposed on the nozzle body, the well being provided in the nozzle well insert, and means made from a heat insulating material for thermally insulating the nozzle well insert from the nozzle body.

26. A nozzle as set forth in claim 25, the well being defined by a wall, the spiral flutes in the second means extending into the well to produce a wiping action of the fluid on the wall defining the well, there being an air gap between the well insert and the heat insulating means.

27. In combination for heating and passing fluid into a mold, a nozzle, there being in the nozzle a runner defined by an internal wall in the nozzle for passing the fluid, means for heating the fluid in the runner, a tip disposed in the runner and having raised and reduced portions extending through a plurality of turns in a helical configuration, the raised portion abutting the internal wall in the nozzle for receiving heat from the nozzle and for heating the fluid in the reduced portion of the tip, means for defining a well and a gate at the end of the tip for passing the fluid into the mold, and the reduced portion of the tip providing a movement of the fluid through the well in a direction to provide a wiping action in the well, the well being defined by a wall, the raised and reduced portions of the tip extending into the well to provide a wiping action by the fluid on the wall defining the well as the fluid flows through the well, the spiral tip having a converging portion at its free end and the raised and reduced portions of the spiral tip extending through the portion of the converging portion at the free end of the spiral tip, the well being defined by a wall to provide for a wiping action on the wall of the well by the fluid flowing through the converging portion at the free end of the spiral tip.

28. In combination for heating and passing fluid into a mold, a nozzle, there being in the nozzle a runner defined by an internal wall in the nozzle for passing the fluid, means for heating the fluid in the runner, a tip disposed in the runner and having raised and reduced portions extending through a plurality of turns in a helical configuration, the raised portion abutting the internal wall in the nozzle for receiving heat from the nozzle and for heating the fluid in the reduced portion of the tip, means for defining a well and a gate at the end of the tip for passing the fluid into the mold, and the raised and reduced portions of the tip extending into the well, the reduced portion of the tip providing a movement of the fluid through the well in a direction to provide a wiping action in the well, the tip having an outlet for the fluid flowing through the reduced portion of the tip, and the means defining the well and the gate constituting a nozzle well insert disposed on the nozzle and having the well for receiving the outlet end of the tip and having the gate at the end of the well, the tip being constructed and disposed relative to the well for providing a removal of the fluid previously in the well by the fluid flowing through the reduced portion of the tip, the spiral tip having a converging portion at its free end and the raised and reduced portions of the spiral tip extending through the portion of the converging portion at the free end of the spiral tip, the well being defined by a wall to provide for a wiping action on the wall of the well by the fluid flowing through the converging portion at the free end of the spiral tip.

29. In a combination as set forth in claim 28, including, the spiral tip having a surface coating with properties of inhibiting the tip from becoming deformed by the flow of the fluid through the converging portion of the spiral tip, and means for regulating the temperature of the fluid flowing through the spiral tip.

* * * * *